US005672664A

United States Patent [19]
DeRudder et al.

[11] Patent Number: 5,672,664
[45] Date of Patent: Sep. 30, 1997

[54] COLOR IMPROVED POLYCARBONATE COMPOSITIONS AND MOLDED ARTICLES

[75] Inventors: James L. DeRudder; Richard W. Howery, both of Mt. Vernon, Ind.

[73] Assignee: General Electric Company, Pittsfield, Mass.

[21] Appl. No.: 680,733

[22] Filed: Jul. 15, 1996

Related U.S. Application Data

[63] Continuation of Ser. No. 259,419, Jun. 14, 1994, abandoned.

[51] Int. Cl.$^6$ ............................................ C08L 69/00
[52] U.S. Cl. ............................................ 525/469; 525/470
[58] Field of Search .................................... 525/469, 470

[56] References Cited

U.S. PATENT DOCUMENTS

| 3,161,615 | 12/1964 | Goldberg | 260/47 |
|---|---|---|---|
| 3,220,973 | 11/1965 | Goldberg | 260/47 |
| 3,312,659 | 4/1967 | Kurkjy et al. | 260/47 |
| 3,312,660 | 4/1967 | Kurkjy et al. | 260/47 |
| 3,313,777 | 4/1967 | Elam et al. | 260/47 |
| 3,334,154 | 8/1967 | Kim et al. | 260/860 |
| 3,647,747 | 3/1972 | Bialous | 260/45.7 R |
| 3,666,614 | 5/1972 | Snedeker et al. | 161/183 |
| 3,751,400 | 8/1973 | Crennan et al. | 260/47 XA |
| 4,624,972 | 11/1986 | Nace | 523/136 |
| 4,657,949 | 4/1987 | Nace | 523/137 |
| 4,686,245 | 8/1987 | Nelson | 522/163 |
| 4,757,104 | 7/1988 | Nace | 524/211 |
| 4,767,810 | 8/1988 | Nelson | 524/56 |
| 4,778,656 | 10/1988 | Allen et al. | 422/20 |
| 4,873,279 | 10/1989 | Nelson | 524/384 |
| 5,118,726 | 6/1992 | Mizutani et al. | 523/136 |
| 5,187,208 | 2/1993 | Rodenhouse | 523/136 |
| 5,225,526 | 7/1993 | Fukawa et al. | 524/119 |

FOREIGN PATENT DOCUMENTS

| 359366 | 3/1990 | European Pat. Off. | 525/470 |
|---|---|---|---|
| 376289 | 7/1990 | European Pat. Off. | |

OTHER PUBLICATIONS

ASTM Standards D1925, "Standard Test Method for Yellowness Index of Plastics", American Society for Testing and Materials (1988), pp. 151–153.

Encyclopedia of Polymer Science and Technology "Stabilization", vol. 15 (1989), pp. 539–580.

*Primary Examiner*—David Buttner

[57] ABSTRACT

A thermoplastic molding composition including at least one polycarbonate resin which is a polycarbonate homopolymer or copolymer; and an amount of at least one tetrahalobisphenol A copolymer effective to reduce the yellowness index of the at least one polycarbonate resin as determined after thermally molding the composition into an article. The article molded from the thermoplastic molding composition has a lower yellowness index than that of an article molded from a corresponding thermoplastic molding composition which does not contain any of the at least one tetrahalobisphenol A copolymer.

8 Claims, No Drawings

COLOR IMPROVED POLYCARBONATE COMPOSITIONS AND MOLDED ARTICLES

This is a continuation of application Ser. No. 08/259,419 filed on Jun. 14, 1994, now abandoned.

BACKGROUND OF THE INVENTION

1. Field of the Invention

The invention relates to color stabilization of polycarbonate compositions and articles molded therefrom, and, more particularly, to polycarbonate compositions which contain a polymeric color improving agent, to articles molded therefrom which have an improved color, and to use of a specific polymeric color improving agent for improving the color of polycarbonate compositions.

2. Background of the Related Art

Synthetic thermoplastic polymers are used increasingly to mold articles useful as containers and packaging for commodities, as well as medical and surgical containers, packaging, instruments, prosthetics, tubing, and working components of treatment apparatus. The selection of a particular thermoplastic polymer will depend on the physical properties required in the molded article.

Of particular commercial importance is the improvement of stability of polymers, including, for example, thermal stability, rheological stability, color stability, oxidative stability, ozonation stability, light stability, ultraviolet light stability, gamma radiation stability, and hydrolytic stability. In each case, specific chemical agents have been identified that improve one of these specific types of commercially important stability parameters. This can result in a large number of similar products that differ only in their relative stability to various different conditions. The process of developing compositions that only meet single requirements excludes the applications that have multiple stability requirements. As is taught for example by Fukawa et al. in U.S. Pat. No. 5,225,526 "there have not yet been obtained any stabilized compositions which are free from all of the noted problems: heat resistance, hot water resistance and coloration is recycle molding". Thus, Fukawa et al. recognize that the systematic approach to improved stability across more than a single parameter or requirement is recognized as a serious deficiency in the prior art.

The problem of polymer degradation is typically managed by the addition of various stabilizers and additives to the polymer. Since the art is not systematic and predictive, these solutions are varied and many do not provide a consistent basis for prediction of effects as the polymer to be stabilized is varied or as chemical changes are made to the stabilizer compounds used. The art thus contains conflicting statements and teachings. Moreover, it is recognized by those skilled in the art that no correlation exists among the various environmental stability effects, or the specific chemical agents utilized to achieve degradation resistance. Thus, for example, additives which provide gamma radiation stabilization for polymeric materials typically are not expected to simultaneously provide thermal stabilization and visa versa.

The color of the molded article is one property of aesthetic importance, a clear, colorless, i.e., low yellowness index, article having a high optical transparency, little or no haze, and good color stability being preferred.

An aesthetic color is one which is preferably "water white", and has the lowest possible yellowness index as measured by ASTM Designation D 1925-70 (Reapproved 1988) which is a standard test method for yellowness index of plastics. Polycarbonate resins have many properties which are advantageous for such articles, however, color and clarity are frequently adversely impacted by the constituents of the thermoplastic molding composition, as well as by molding parameters employed to produce the article, such as molding at high temperatures, which can induce yellowing and haze formation.

Commercially viable polymers usually require color stabilizers, see, for example, "STABILIZATION", *Encyclopedia of Polymer Science And Technology*, Vol. 15 (1989), pps. 539–583. Typical color stabilizers are selected from chemical classes including phosphites, hindered phenols, epoxides, etc. Other ingredients have been found to improve color in polycarbonates, such as the polyols, epoxides, and polyesters described by Nelson in U.S. Pat. Nos. 4,686,245; 4,767,810; and 4,873,279, the disclosures of which are incorporated by reference herein.

Further, prior art stabilizing agents are known which inhibit the yellowing and haze formation of articles molded from polycarbonates when subjected to ionizing radiation. Representative of these yellowing inhibitors are organic compounds such as those described in U.S. Pat. Nos. 4,624,972 (Nace); 4,657,949 (Nace); 4,757,104 (Nace); and 5,118,726 (Mizutani et al.). Nace '972 discloses esters of aromatic polycarboxylic acids; Nace '949 discloses sorbate compounds including sorbic acid, sorbic acid amides, and esters; Nace '104 discloses linolenic compounds; and Mizutani et al. disclose bromine-containing compounds. The presence of any additive in a polycarbonate resin molding composition, however, generally has an affect on other physical properties which may be undesirable and limit their use.

Another strategy for inhibiting the yellowing and haze formation of a polycarbonate resin upon exposure to ionizing radiation is described in U.S. Pat. No. 4,778,656 (Allen et al.). The method entails blending the polymer with another polymer, which has the effect of improving ionizing radiation resistance of the polycarbonate over and above a mere dilution effect. Examples of such additive polymers include polyester homopolymers, polysulfone-carbonates and certain copolyesters. Like the previously described organic compounds which provide a yellowness inhibiting effect, these additive polymers also affect physical properties of articles molded from blends of the mixed polymers which may be undesirable and limit their use.

Thus, while it is known to incorporate color stabilizers into commercial polymers, such as polycarbonates, and to improve the irradiation resistance of articles molded from polycarbonates by admixing therewith certain organic compounds and additive polymers, the search continues for molded articles having improved color as molded.

It is therefore an object of the present invention to provide a color improving agent for polycarbonate resin-based thermoplastic molding compositions.

It is a further object of the present invention to provide a thermoplastic molding composition based on polycarbonate resins which includes a color improving agent and which provides molded articles having improved color as molded, as measured by yellowness index.

It is yet another object of the invention to provide a molded article of improved color and a method of preparing same, both of which employ the thermoplastic molding composition.

SUMMARY OF THE INVENTION

Applicants surprisingly found that the addition of a halogenated polymer to a bisphenol A polycarbonate resulted in reduced color contrary to expectation. Thus, while addition of the halogenated compounds typically added to polymeric compositions as flame retardants by the prior art would be expected to increase yellowness of the compositions due to the intrinsic yellow color of these halogenated compounds, Applicants have discovered that specific halogenated materials, tetrahalobisphenol A copolymers, are effective to reduce the yellowness index of polycarbonate resins.

Thus, the objects of the present invention are achieved by including in a polycarbonate composition comprised of at least one polycarbonate resin which is a polycarbonate homopolymer or copolymer (hereinafter PC), an amount of at least one tetrahalobisphenol A copolymer (hereinafter THBPAC) effective to reduce yellowness index of the at least one polycarbonate resin, as measured after thermally molding an article from the polycarbonate composition.

The present invention additionally provides a thermoplastic molding composition, comprising: at least one polycarbonate resin which is a polycarbonate homopolymer or copolymer; and an amount of at least one tetrahalobisphenol A copolymer effective to reduce the yellowness index of the at least one polycarbonate resin so that the thermoplastic molding composition after being molded into an article has a lower yellowness index than that of an article molded from a corresponding thermoplastic molding composition which contains none of the at least one tetrahalobisphenol A copolymer.

Preferably the THBPAC is present in an amount ranging from about 0.0001 to about 5% by weight based on the weight of the composition; most preferably from about 0.004 to about 4% by weight, especially from about 0.04 to about 0.4% by weight.

Amounts of THBPAC below about 0.0001% by weight provide little practical color improvement. Amounts of THBPAC above about 5% by weight can lead to poorer color and begin to affect the physical properties of the articles.

The polycarbonate resin may be selected from a wide range of polycarbonate homopolymers or copolymers. Preferably, the polycarbonate resin is a bisphenol A polycarbonate homopolymer.

The present invention additionally provides an article of improved color, comprising an article which has been molded from a thermoplastic molding composition as described above. Such a molded article of improved color is provided by a method of preparing a thermally molded article having improved color, comprising:

a. formulating a thermoplastic molding composition as described above; and b. thermally molding an article from the thermoplastic molding composition, wherein the article has a lower yellowness index than that of an article molded from a corresponding thermoplastic molding composition which does not contain any of the at least one tetrahalobisphenol A copolymer.

Any thermal molding technique may be employed, non-limiting examples including, extruding, injecting, blowing, and drawing. Similarly, suitable molding parameters of temperature, pressure, etc. can be readily determined by the artisan.

DETAILED DESCRIPTION OF THE PREFERRED EMBODIMENTS

A bisphenol A polycarbonate resin having a molecular weight of about 24,000 and an intrinsic viscosity of about 0.46, and containing relatively small amounts of a tetrabromobisphenol A copolymer (hereinafter TBBPAC) surprisingly was found to provide molded articles having significantly improved color as measured by yellowness index. Even thermoplastic molding compositions containing only doping amounts of from about 0.0004 to about 0.4 weight percent of the TBBPAC were found to provide molded articles having reduced yellowness index, while the benefit was found to continue out to 4.0 weight percent of the TBBPAC. The tetrabromobisphenol A copolymer was prepared from 50 weight % tetrabromobisphenol A monomer (a known flame retardant) and 50 weight % bisphenol A monomer.

Halogens, particularly chlorine and bromine, are known bleaching agents so that one possible mechanism accounting for the improved color of molded articles according to the invention is that low level addition of halogens generates free halogen during molding which bleach out color from the PC. THBPAs have poor thermal stability in general and are themselves rather yellow, however, so that addition at higher levels in excess of about 5% by weight based on the PC is expected to countermand the color reduction due to the intrinsically higher yellowness of the THBPAC.

The polycarbonates useful in the application of this invention are the usual polycarbonates which have been known for at least 35 year. They are prepared by standard methods and utilize the typical dihydric phenols employed in the synthesis of polycarbonates. These polycarbonates, as well as methods of their preparation, are described inter alia in U.S. Pat. Nos. 3,161,615 (Goldberg); 3,220,973 (Goldberg); 3,312,659 (Kurkjy et al.); 3,312,660 (Kurkjy et al.); 3,313,777 (Elam et al.); and 3,666,614 (Snedeker et al.), all of which are incorporated herein by reference. The polycarbonates may be prepared by a variety of known methods, including the interfacial polymerization process which involves a co-reaction of at least one dihydric phenol with a carbonate precursor. The polycarbonate resins contain at least one recurring or repeating structural unit represented by the formula

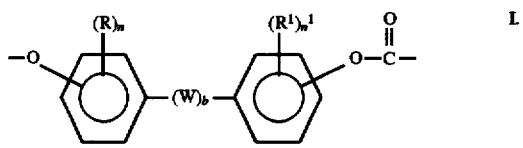

wherein:

R and $R^1$ are independently selected from monovalent hydrocarbon radicals and monovalent hydrocarbonoxy radicals;

W is selected from divalent hydrocarbon radicals,

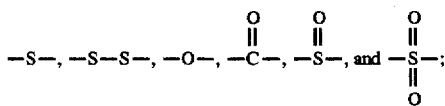

n and $n^1$ are independently selected from integers having a value of from 0 to 4 inclusive;

and b is either zero or one.

The monovalent hydrocarbon radicals represented by R and $R^1$ include the alkyl, cycloalkyl, aryl, aralkyl and alkaryl radicals. The preferred alkyl radicals are those containing from 1 to about 12 carbon atoms. The preferred cycloalkyl radicals are those containing from about 4 to about 8 ring carbon atoms. The preferred aryl radicals are those containing from 6 to 12 ring carbons, i.e., phenyl, biphenyl, and naphthyl. The preferred aralkyl and alkaryl radicals are those containing from 7 to about 14 carbons atoms.

The monovalent hydrocarbonoxy radicals represented by R and $R^1$ may be represented by the formula —$OR^2$ wherein $R^2$ is a monovalent hydrocarbon radical of the type described herein. Preferred hydrocarbonoxy radicals are the alkoxy and aryloxy radicals.

The divalent hydrocarbon radicals represented by W include the alkylene, alkylidene, cycloalkylene, and cycloalkylidene radicals. The preferred alkylene radicals are those containing from 2 to about 20 carbons. The preferred alkylidene radicals are those containing from 1 to about 20 carbons. The preferred cycloalkylene and cycloalkylidene radicals are those containing from 6 to about 16 ring carbon atoms. The letter b is preferably 1 and n and $n^1$ are each preferably zero.

Typically, the dihydric phenols utilized in the preparation of polycarbonate resins may be represented by the general formula

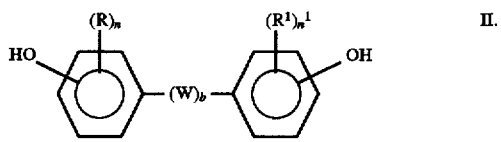

wherein R, $R^1$, n, $n^1$, W and b are as defined herein.

Some illustrative non-limiting examples of dihydric phenols falling within the scope of Formula II include:

2,2-bis(4-hydroxyphenyl)propane(bisphenol A);

2,2-bis(3,5-dimethyl-4-hydroxyphenyl)propane;

1,1-bis(4-hydroxyphenyl)cyclohexane;

1,1-bis(4-hydroxyphenyl)cyclododecane;

1,1-bis(3,5-dimethyl-4-hydroxyphenyl)cyclododecane;

1,1-bis(4-hydroxyphenyl)decane;

1,4-bis(4-hydroxyphenyl)butane;

bis(4-hydroxyphenyl)methane;

4,4'-thiodiphenol; and bis(4-hydroxyphenyl)ether.

Other dihydric phenols which are useful are described in U.S. Pat. Nos. 2,998,835; 3,028,365 and 3,334,154, all of which are incorporated herein by reference.

The preferred dihydric phenol is bisphenol A.

The carbonate precursor may be a carbonyl halide, a carbonate ester, or a bishaloformate. The carbonyl halides may be carbonyl bromide, carbonyl chloride, or mixtures thereof. The carbonate esters may be diphenyl carbonate; di(alkylphenyl) carbonates, such as di(tolyl) carbonate; di(naphthyl) carbonate; and phenyl tolyl carbonate. The bishaloformates that can be used include the bishaloformates of dihydric phenols such as the bischloroformates of bisphenol A and hydroquinone; and the bis-haloformates of glycols such as the bis-chloroformates of ethylene glycol, neopentyl glycol, and polyethylene glycol. The preferred carbonate precursor is carbonyl chloride, also known as phosgene.

The molecular weight of the polycarbonate resin is controlled by a monofunctional phenol which terminates the ends of the resin. Examples of phenols useful for endcapping the polycarbonates useful in the invention include, but are not limited to, phenol, paracumyl phenol and paratertiary butyl phenol.

The preferred polycarbonate resin employed in the present invention is a bisphenol A polycarbonate.

The tetrahalobisphenol A copolymers useful in this invention include tetrachloro, tetrabromo, and tetraiodo bisphenol A copolymers, preferably tetrachloro and tetrabromo bisphenol A copolymers; most preferably tetrabromo bisphenol A copolymers. Such copolymers are described in U.S. Pat. Nos. 3,334,154 (Kim); 3,647,747 (Bialous); and 3,751,400 (Crennan), the disclosures of which are incorporated herein by reference.

The tetrahalobisphenol A copolymer preferred for the present invention is a copolymer of tetrabromobisphenol A and bisphenol A, and can be produced by, for example, the standard interfacial polymerization process for polycarbonates, also known as the aqueous-caustic process, as can any of the tetrahalobisphenol A(s). Bisphenol A is halogenated by any of several well known methods. Thus, for example, bisphenol A is brominated to provide tetrabromobisphenol A which is readily available and an item of commerce.

Then, weighed amounts of the reagents are combined and polymerized, and the precipitate formed is put through a steam system to recover a powder. A THBPAC containing at least 50% by weight of the THBPA is preferred so that the halogen content is significant. Thus, for example, a preferred THBPAC is a TBBPAC and is prepared from 50% by weight of tetrabromobisphenol A and 50% by weight bisphenol A so that the TBBPAC has a bromine content of about 27% by weight if the TBBPAC is combusted and assayed.

Preparation of admixtures of the materials may be carried out in any conventional manner. In the usual case, pellets or finely divided dry powders of the materials are simply blended together in a mechanical mixer and the blend is compounded by passage through an extruder at an elevated temperature above the softening points of the polymeric constituent(s). This method is the preferred method for the present invention.

Admixtures may alternatively be prepared by dissolving the materials in a mutual solvent from which they are subsequently recovered in blended form. Recovery may be by evaporation, distillation, or precipitation as is known in the art.

The resulting composition can be further modified if desired, by incorporation of standard amounts of conventional additives, such as thermal stabilizers, for example, a phosphite; an antioxidant, for example, a hindered phenol; a mold release agent; and the like.

The compositions of the present invention can be used for various applications, including containers and packaging for commodities, such as foods, and in the medical field. However, compositions according to the present invention are particularly well suited for molding transparent articles useful in many applications requiring excellent optical properties, such as, transparency, low yellowness, and low haze. Polycarbonates have previously been a suggested material of choice for such articles and the present invention now teaches that tetrahalobisphenol A copolymers represent a new class of compounds found to improve the color of articles molded from polycarbonate resins.

Articles may be formed by any of several well-known techniques suitable for thermoplastics, for example, extrusion, injection molding, and blow molding.

The present invention includes a method of preparing a thermally molded article. The method includes providing an article molded in a solid form from a thermoplastic molding composition according to the invention as discussed in the foregoing.

The following example describes the manner and process of making and using the invention, and sets forth the best mode contemplated by the inventor for carrying out the invention. The example, however, is not to be construed as limiting the invention.

EXAMPLE

Weighed amounts of LEXAN 125 and TB50, both made by The General Electric Company, were combined.

LEXAN 125 is a bisphenol A polycarbonate and is commercially available as a powder. It has a nominal molecular weight of 24,000 obtained using a polystyrene standard, it being noted that, because of the high chain stiffness of polycarbonate, there is about a 2:1 difference between the absolute measure of molecular weight and the polystyrene standard measure. LEXAN 125 additionally has a nominal inherent viscosity (IV) of 0.46. The LEXAN 125, moreover, was selected to be free of any bromine so that the effect of added bromine could be readily determined.

TB50 is a tetrabromobisphenol A copolymer containing nominally 50% by weight bisphenol A, hence the designation TB50. This material has flame retardant properties and is used in small amounts in many products as a flame retarding bromine source.

Dry powder blends of BPA polycarbonate and TBBPA polycarbonate were tumble blended in the proportions listed in Table 1. Compositions were extruded on a Werner Pfleiderer ZSK 30 mm twin screw extruder at a temperature of at least 300° C. The resulting pellets were dried for at least six hours at 110° C. before injection molding into ASTM test specimens (chips) on an 80 ton, four oz. injection molding machine operated at a temperature of about 300° C. The chips had a thickness of 0.125 inches and yellowness index (YI) was measured in the as-molded state according to ASTM test method D-1925. Articles molded from compositions according to the invention (Samples B–E) are set forth in Table 1, as is an article molded from a comparative composition containing no TB50. purposes (Sample A). The results are set forth in Table 1.

TABLE 1

| Sample No. | % by wt. BPA PC (LEXAN 125) | % by wt. TBBPAC TB-50 | YI (ave.) |
|---|---|---|---|
| 1 | 100 | 0 | 2.56 |
| 2 | 99.9996 | 0.0004 | 2.25 |
| 3 | 99.996 | 0.004 | 1.89 |
| 4 | 99.96 | 0.04 | 1.81 |
| 5 | 99.6 | 0.4 | 1.72 |
| 6 | 96.0 | 4.0 | 1.81 |
| 7 | 0 | 100 | 2.72 |

As can be seen from the data, both the BPA PC control sample (Sample 1, 100% LEXAN 125) and the TBBPAC control sample (Sample 7, 100% TB-50) have a higher yellowness index (YI) than any of the samples according to the invention (Samples 2–6). Optimal blends appear to be those in which the TB-50 ranges from about 0.04 to about 4.0 wt. %. Blends containing about 0.4 wt. % TB-50 showed the best improvement in color as molded.

It is understood that various other modifications will be apparent to and can be readily made by those skilled in the art without departing from the scope and spirit of the present invention. Accordingly, it is not intended that the scope of the claims appended hereto be limited to the description set forth above but rather that the claims be construed as encompassing all of the features of patentable novelty which reside in the present invention, including all features which would be treated as equivalents thereof by those skilled in the art to which the invention pertains.

What is claimed is:

1. A method of preparing a thermally molded article having improved color, comprising:
   a. formulating a thermoplastic molding composition which is a blend and which comprises:
      at least one polycarbonate resin which is a polycarbonate homopolymer or copolymer; and
      less than about 0.4% by weight of at least one polycarbonate copolymer of tetrahalo bisphenol A and bisphenol A, having a halogen content of about 27% by weight, effective to reduce yellowness index of the at least one polycarbonate resin; and
   b. thermally molding an article from the thermoplastic molding composition,
      wherein the article has a lower yellowness index than that of an article molded from a corresponding thermoplastic molding composition which does not contain any of the at least one copolymer.

2. The method of claim 1 wherein the copolymer of tetrahalo bisphenol A and bisphenol A is present in an amount of at least about 0.001% by weight based upon the polycarbonate resin.

3. The method of claim 1 wherein the copolymer of tetrahalo bisphenol A and bisphenol A is present in an amount of at least about 0.004% by weight based upon the polycarbonate resin.

4. The method of claim 1 wherein the copolymer of tetrahalo bisphenol A and bisphenol A is present in an amount of at least about 0.04% by weight based upon the polycarbonate resin.

5. The method of claim 1 wherein the copolymer of tetrahalo bisphenol A and bisphenol A contains about 50% by weight of tetrahalobisphenol A and 50% by weight of bisphenol A.

6. The method of claim 1 wherein the tetrahalobisphenol A is selected from tetrachlorabisphenol A, tetrabromobisphenol A, tetraiodobisphenol A or a mixture thereof.

7. The method of claim 1 wherein the tetrahalobisphenol A is tetrabromobisphenol A.

8. The process of improving color of a polycarbonate composition and articles molded therefrom, comprising: including in a polycarbonate composition comprised of at least one polycarbonate resin which is a polycarbonate homopolymer or copolymer, less than about 0.4% by weight of at least one polycarbonate copolymer of tetrahalobisphenol A and bisphenol A, having a halogen content of about 27% by weight, effective to reduce yellowness index of the at least one polycarbonate resin, as measured after thermally molding an article from the poly-carbonate composition.

* * * * *